J. EASTERLY.
OVEN.
No. 20,133.  Patented Apr. 27, 1858.
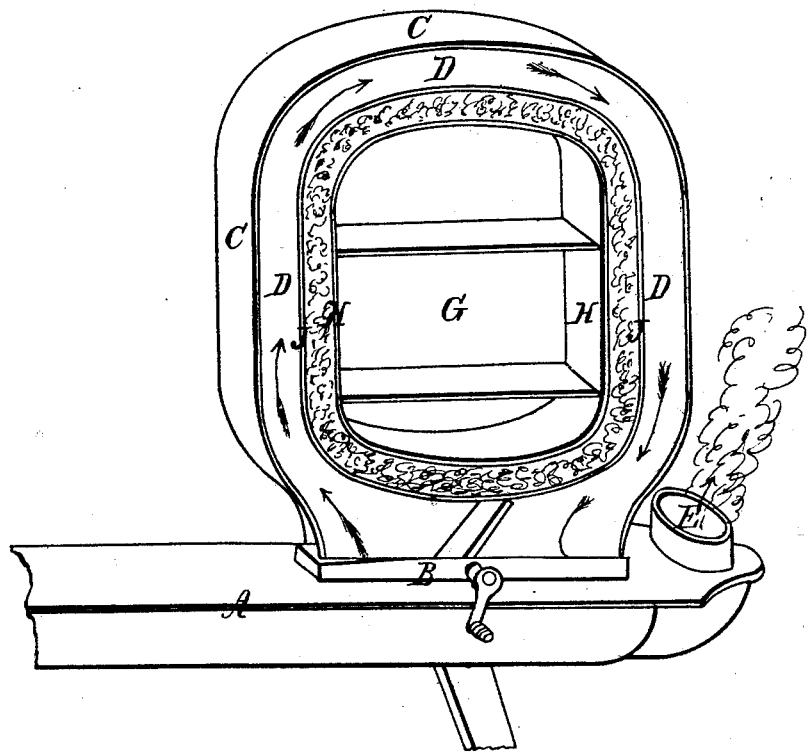
Witnesses
Inventor
James Easterly

UNITED STATES PATENT OFFICE.

JAMES EASTERLY, OF ALBANY, NEW YORK.

OVEN FOR COOKING-STOVES.

Specification of Letters Patent No. 20,133, dated April 27, 1858.

*To all whom it may concern:*

Be it known that I, JAMES EASTERLY, of the city of Albany, State of New York, have invented a new and useful Improvement in the Construction of Ovens for Cooking-Stoves; and I declare the following specification, with the drawings hereto attached as part thereof, to be a full and complete description of my invention.

It is a fact well known to persons using the ovens of cooking stoves, that for many purposes they are inferior to brick ovens, and especially for the baking of bread, cakes, and pastry and all articles requiring the communication of heat slowly for the complete cooking of the entire mass, inasmuch as their iron plates transmit, and radiate heat so rapidly that unless great watchfulness is exercised in regulating the current of heat from the fire, as it passes around the oven, the articles to be cooked will be burned on the surface while the interior of their mass will be uncooked, whereas in a brick oven the walls of earthen material part with there acquired caloric slowly and equally, penetrating gradually, equally and thoroughly the whole mass of material subjected to its action.

The drawing represents in perspective the kind of oven used with stoves known as the elevated oven, as constructed according to my improved plan, A, being the top body of the stove, B the oven neck by which it communicates with the stove, and the superstructure above this, the oven with the end plate with door removed to show its construction.

C C shows the outer plates of the oven D D the smoke and hot air flue surrounding the oven, E the smoke exit opening and flange, G the interior of the oven, H H the outer surrounding iron plate or wall the oven chamber, J, J, second plate or wall a short space outside of H H and entirely surrounding the oven and with plates C, C, forming the flue D, D. The ends of the oven to be closed in the usual manner.

The space between H and J which is variable in different ovens, as may be found to operate best in practice as the oven may be exposed to different degrees of heat, or used for different purposes, is to be filled in with some earthy or slow conducting substance, such as, white or beach sand, yellow sand, or gravel, pounded brick, or any analogous substance, the object I have in view being to interfere between the fire and oven, something of slow conducting and radiating power which having received its heat from the fire on the one side shall radiate it slowly and equally into the oven chamber, doing its duty in a manner precisely analogous to the operation of the ordinary brick or stone oven.

Experiments have proven that an oven so constructed bakes in a manner precisely similar to a brick oven, with this advantage that whereas the brick oven having been once heated cannot have any deficiency in caloric supplied during the process of baking, whereas a deficiency in the stove oven can be supplied from the outside if required, when articles are cooking within.

The drawing exhibits my device applied to one sort of stove oven only, but I intend its application to all or any stove ovens or analogous structures.

I am aware that stove ovens have been in whole or part lined with brick, gypsum and other non-conducting substances; the object being in those cases to prevent the radiation of the heat from the interior of the ovens; either to make a cool summer arrangement, or to retain the heat internally. This I disclaim as not being the intention of my arrangement and invention, which requires not nonconducting, but slow conducting solid material, not to keep heat within the oven but to trasmit heat applied externally slowly and steadily to the interior of the oven.

What I claim and desire to secure by Letters Patent is—

The construction of stove ovens or analogous structures by surrounding them, with double outside walls containing in the chamber formed within them some slowly conducting and radiating solid material to absorb heat communicated on the outside of the chamber and radiate the same internally substantially as described in the within specification.

JAMES EASTERLY.

Witnesses:
 E. J. MILLEN,
 RICHARD VARICK DE WITT.